United States Patent [19]
Yamakawa et al.

[11] Patent Number: 6,144,764
[45] Date of Patent: Nov. 7, 2000

[54] METHOD AND APPARATUS FOR ON-LINE HANDWRITTEN INPUT CHARACTER RECOGNITION AND RECORDING MEDIUM FOR EXECUTING THE METHOD

[75] Inventors: Takeshi Yamakawa, Iizuka; Toyoshi Odahara; Naohiro Inagawa, both of Kitayushu, all of Japan

[73] Assignee: Mitsui High-tec, Inc., Fukuoka-ken, Japan

[21] Appl. No.: 09/009,533

[22] Filed: Jan. 20, 1998

[30] Foreign Application Priority Data

| | | | |
|---|---|---|---|
| Jul. 2, 1997 | [JP] | Japan | 9-177447 |
| Jul. 2, 1997 | [JP] | Japan | 9-177448 |

[51] Int. Cl.$^7$ ............................ G06K 9/00; G06K 9/48
[52] U.S. Cl. ............................ 382/187; 382/197
[58] Field of Search ............................ 382/187, 197, 382/198

[56] References Cited

U.S. PATENT DOCUMENTS

| | | | |
|---|---|---|---|
| 4,764,972 | 8/1988 | Yoshida et al. | 382/187 |
| 4,850,026 | 7/1989 | Jeng et al. | 382/21 |
| 4,947,156 | 8/1990 | Sato et al. | 340/707 |
| 5,245,674 | 9/1993 | Huttenlocher et al. | 382/196 |
| 5,333,209 | 7/1994 | Sinden et al. | 382/187 |
| 5,544,279 | 8/1996 | Li et al. | 382/187 |
| 5,579,408 | 11/1996 | Sakaguchi et al. | 382/187 |
| 5,583,946 | 12/1996 | Gourdol | 382/187 |
| 5,734,750 | 3/1998 | Arai et al. | 382/202 |
| 5,757,962 | 5/1998 | Gallo et al. | 382/187 |
| 5,802,204 | 9/1998 | Basehore | 382/186 |
| 5,812,698 | 9/1998 | Platt et al. | 382/186 |
| 5,835,632 | 11/1998 | Takasu et al. | 382/185 |
| 5,835,633 | 11/1998 | Fujisaki et al. | 382/187 |
| 5,889,889 | 3/1999 | Sinden | 382/187 |
| 5,903,667 | 5/1999 | Kuzunuki et al. | 382/187 |

OTHER PUBLICATIONS

Katsuo Ikeda et al., "Online recognition of hand–written characters utilizing positional and stroke vector sequences", Pattern Recognition, vol. 13, No. 3, pp. 191–206, 1981.

Japanese Language Article entitled Human Interface For Personal Information Systems—Online Handwriting Recognition—by Toshiaki Morita dated Jan. 1996 with English Translation thereof attached.

*Primary Examiner*—Amelia Au
*Assistant Examiner*—Martin Miller
*Attorney, Agent, or Firm*—Jordan and Hamburg LLP

[57] ABSTRACT

The invention aims at recognition of a handwritten input character on-line with quite high accuracy. The method of on-line handwritten input character recognition of the invention is characterized in that ordinary strokes and transition strokes and/or start-end (s-e) strokes of a handwritten input character sampled on-line are compared with ordinary strokes and transition strokes and/or s-e strokes of dictionary's characters previously registered in a dictionary and the character corresponding to the handwritten input character is recognized on the basis of the result of the comparison. Otherwise, when the dictionary's character most similar to the input character corresponds to a preset character, the handwritten input character is identified by using characteristic features of the corresponding character. Thus, by comparing ordinary strokes and transition strokes and/or s-e strokes of a handwritten input character sampled on-line with ordinary strokes and transition strokes and/or s-e strokes of dictionary's characters previously registered in a dictionary and recognizing the character corresponding to the handwritten input character on the basis of the result of the comparison, a handwritten input character which was difficult to recognize only by means of ordinary strokes can be recognized with high accuracy.

11 Claims, 16 Drawing Sheets

FIG.11 Relationship between Component Vector and MSG (Direction "0") (example: Where θ=315°, $\mu_0(315°)=0.5$)

Relationship between Component Vector and MSG (Direction "1") (example: Where θ=315°, $\mu_1(315°)=0$)

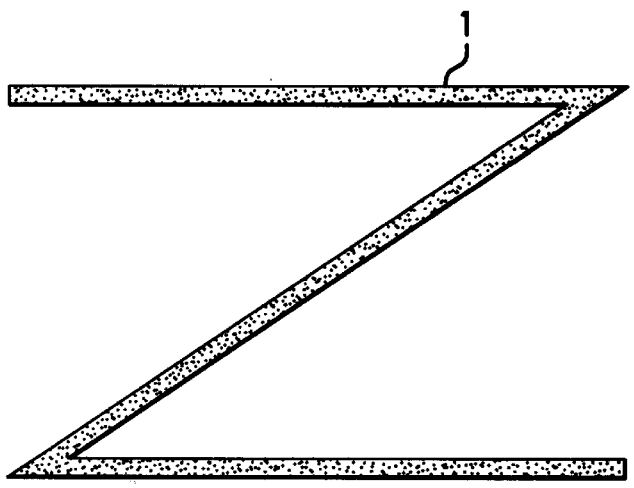
(a) INPUT CHARACTER PATTERN
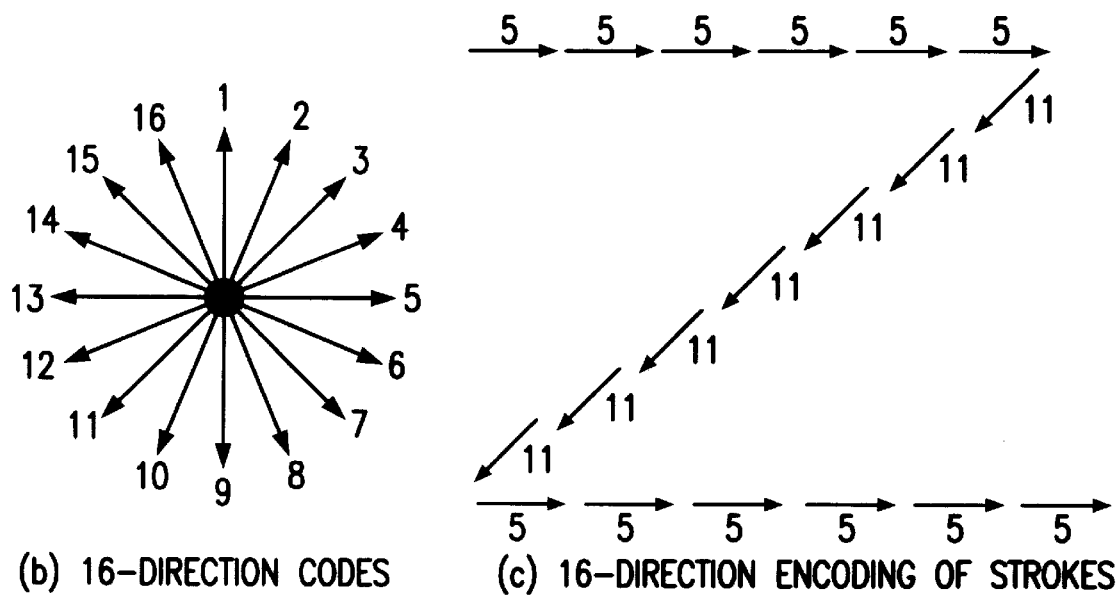
(b) 16-DIRECTION CODES     (c) 16-DIRECTION ENCODING OF STROKES
FIG.24

METHOD AND APPARATUS FOR ON-LINE HANDWRITTEN INPUT CHARACTER RECOGNITION AND RECORDING MEDIUM FOR EXECUTING THE METHOD

BACKGROUND OF THE INVENTION

1. Field of the Invention

The present invention relates to a method of and an apparatus for on-line handwritten input character recognition for recognizing an on-line handwritten input character according to its strokes or by the use of a fuzzy associated memory and a recording medium for executing the method.

2. Description of the Related Art

Handwritten input character recognition is broadly classified, according to the algorithm employed, into off-line character recognition, such as an OCR, in which character recognition is made after a character has been written and on-line character recognition in which information of the trajectory of handwriting is taken in to identify the character on a real time basis while a character is being written, as in the pen inputting.

In the on-line character recognition, information of the trajectory of handwriting, i.e., directional information, while a character is written is sampled, the directional information and directional information previously registered in a dictionary are compared with each other, and the character in the dictionary with the highest similarity is output as the result of the recognition.

FIG. 24 is an explanatory drawing of 16-direction encoding of a stroke in a conventional system for on-line recognition of a handwritten input character.

For example, the stroke 1 of the handwritten input character "Z" is 16-direction encoded as shown in FIG. 24(c) according to the 16-direction codes shown in FIG. 24(b) and represented by a string of codes. The string of directional codes of the input handwritten character is matched with directional codes of characters registered in a Chinese character dictionary and, thereby, the character is recognized (refer to The Journal of Japan Society of Mechanical Engineers, Vol. 99, No. 926, pp. 11–14 (January 1996)).

However, there is a problem with the conventional on-line character recognition method, when the objects of recognition are set to be Chinese characters, Japanese HIRAGANAs, Japanese KATAKANAs, numerals, alphabetical (capital and small) letters, and symbols, that it is difficult to discriminate between characters directional information of the actual stroke of which are very alike. Further, in the conventional method of on-line handwritten input character recognition, since the stroke is divided into 16 directions to be converted to the 16-direction code system, a stroke in between the 16 directions cannot be represented therein and there has been a limit that further precision cannot be obtained.

SUMMARY OF THE INVENTION

It is an object of the invention to achieve recognition of on-line handwritten input characters with still higher accuracy.

A first method of on-line handwritten input character recognition of the invention is characterized by that it comprises the steps of comparing ordinary strokes and transition strokes and/or start-end (s-e) strokes of a handwritten input character sampled on-line with ordinary strokes and transition strokes and/or s-e strokes of a dictionary's characters previously registered in a dictionary and recognizing the character corresponding to the handwritten input character on the basis of the result of the comparison.

A second method of on-line handwritten input character recognition of the invention is characterized by that it comprises the steps of comparing ordinary strokes and transition strokes and/or s-e strokes of a handwritten input character sampled on-line with ordinary strokes and transition strokes and/or s-e strokes of dictionary's characters previously registered in a dictionary and identifying the handwritten input character, when the most similar dictionary's character thereto corresponds to a preset character, by using characteristic features of the corresponding character.

In the above described first and second methods, it is possible to register stroke data of a handwritten input character sampled on-line and the dictionary's characters corresponding thereto in the dictionary.

Further, a first apparatus for on-line handwritten input character recognition of the invention is characterized by that it comprises means for comparing ordinary strokes and transition strokes and/or s-e strokes of a handwritten input character sampled on-line with ordinary strokes and transition strokes and/or s-e strokes of dictionary's characters previously registered in a dictionary and means for recognizing the character corresponding to the handwritten input character on the basis of the result of the comparison.

Further, a recording medium readable by a computer for carrying out the first method has registered therein procedures for comparing ordinary strokes and transition strokes and/or s-e strokes of a handwritten input character sampled on-line with ordinary strokes and transition strokes and/or s-e strokes of dictionary's characters previously registered in a dictionary and a program for allowing procedures for recognizing the handwritten input character to be carried out on the basis of the result of the comparison.

According to the above described invention, by comparing ordinary strokes and transition strokes and/or s-e strokes of a handwritten input character sampled on-line with ordinary strokes and transition strokes and/or s-e strokes of dictionary's characters previously registered in a dictionary and recognizing the character corresponding to the handwritten input character on the basis of the result of the comparison, a handwritten input character which was difficult to recognize only by means of ordinary strokes can be recognized with high accuracy.

A third method of on-line handwritten input character recognition of the invention is characterized by that it comprises the steps of breaking down an ordinary stroke of a handwritten input character sampled on-line into a plurality of component vectors, converting each component vector into a fuzzy vector consisting of membership grades in a plurality of directions, comparing the fuzzy vector group as a collection of the obtained fuzzy vectors with the fuzzy vector group of each dictionary's character previously registered in a dictionary, and recognizing the character corresponding to the handwritten input character on the basis of the result of the comparison.

A fourth method of on-line handwritten input character recognition according to the invention is characterized by that it comprises the steps of converting each component vector of a plurality of component vectors obtained by breaking down ordinary strokes of a handwritten input character sampled on-line and of transition strokes and/or s-e strokes into a fuzzy vector consisting of membership grades in a plurality of directions, comparing the fuzzy vector group as a collection of the obtained fuzzy vectors with the fuzzy vector group of each dictionary's character previously registered in a dictionary, and recognizing the character corresponding to the handwritten input character on the basis of the result of the comparison.

In the above described third and fourth methods, the following embodiments can be mentioned:

(1) an ordinary stroke of a handwritten input character is divided into component vectors in at least 32 units;

(2) after the most similar character to a handwritten input character has been extracted from the dictionary, when the extracted character corresponds to a preset character, the handwritten input character is identified by using characteristic features of the corresponding character and the result of the identification is output; and (3) stroke data of a handwritten input character sampled on-line and the dictionary's characters corresponding thereto are registered in the dictionary.

A second apparatus for on-line handwritten input character recognition according to the invention is characterized by that it comprises a character inputting device, means for sampling on-line a character handwritten by the use of the character inputting device, means for breaking down an ordinary stroke of the handwritten input character into a plurality of component vectors, means for converting each component vector into a fuzzy vector consisting of membership grades in a plurality of directions, means for comparing the fuzzy vector group as a collection of the obtained fuzzy vectors with the fuzzy vector group of each dictionary's character previously registered in the dictionary, and means for recognizing the handwritten input character on the basis of the result of the comparison.

Further, a recording medium readable by a computer for carrying out the above third method has registered therein procedures for breaking down an ordinary stroke of a handwritten input character sampled on-line into a plurality of component vectors, procedures for converting each component vector into a fuzzy vector consisting of membership grades in a plurality of directions, procedures for comparing the fuzzy vector group as a collection of the obtained fuzzy vectors with the fuzzy vector group of each dictionary's character previously registered in a dictionary, and a program for allowing procedures for recognizing the handwritten input character to be carried out on the basis of the result of the comparison.

According to the above described invention, by breaking down an ordinary stroke of a handwritten input character sampled on-line into a plurality of component vectors, converting each component vector into a fuzzy vector consisting of membership grades in a plurality of directions, comparing the fuzzy vector group as a collection of the obtained fuzzy vectors with the fuzzy vector group of each dictionary's character previously registered in a dictionary, and recognizing the character corresponding to the handwritten input character on the basis of the result of the comparison, it is made possible through the use of the fuzzy vector family to represent angular information of the trajectory of handwriting continuously and finely so that in-line handwritten input character recognition can be achieved with high accuracy. Further, by having the above described recognition combined with discrimination employing transition strokes and s-e strokes, the rate of recognition can further be improved.

BRIEF DESCRIPTION OF THE DRAWINGS

FIG. 24 shows explanatory drawings of 16-direction encoding of the stroke of an on-line handwritten input character of the related art.

DESCRIPTION OF THE PREFERRED EMBODIMENTS

Figure 1A:
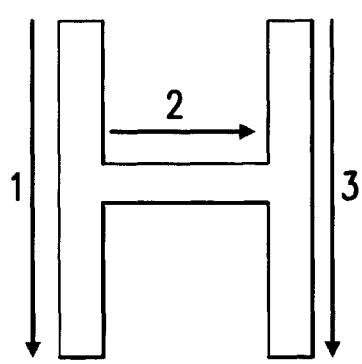
FIG. 1(a) and FIG. 1(b) are explanatory drawings of an ordinary stroke.

FIG. 1(a) is an explanatory drawing of an ordinary stroke of a handwritten input character employed in the present invention.

The ordinary stroke is the trajectory of handwriting extracted as continuous directional information from the movement of a pen made while a character is written with the pen kept in contact with paper. In a handwritten character, such as a numeral, HIRAGANA, KATAKANA, alphabetical letter, Chinese character, and symbol, there are included a plurality of strokes, except a character written in a single stroke, and each of the strokes has a trajectory of handwriting. The information of the trajectory of handwriting representing pen's movement for writing each stroke is called the "ordinary stroke" and, in each handwritten character, there are ordinary strokes of the same number as that of the strokes of the character. A character has a point where writing it is started and, from there, the character is progressively formed with the direction of pen's movement changed. The manner of the change in the direction is characteristic feature of each character. Therefore, it is very effective in character recognition to represent the ordinary strokes 1–3 by component vectors.

Figure 1B:
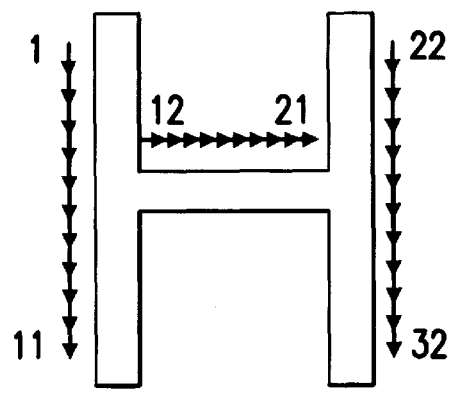

The component vectors shown in FIG. 1(b) represent the movements of the pen in the course of writing a handwritten input character and all the ordinary strokes of the handwritten input character can be broken down into component vectors indicative of directional information. Although a method employing fuzzy vector will be described below as a system of the breaking down a stroke into vectors, the method is not limited to it but the conventional method employing 16 directional codes may also be used.

In the system employing the fuzzy vector, since the total number of the "component vectors" is the smallest number of units representing the trajectory of handwriting in forming a handwritten character, a number greater than the number of strokes of the handwritten character is required for extracting information of the trajectory of handwriting therefrom. In view of the fact that the number into which a character is broken down should be the power of two for ease of digital processing and that the maximum number of a Chinese character is 30 strokes, it is preferred that 32 is used as the number of the minimum units. When the total number of the component vectors is uniformly set to 32 for a single handwritten input character, a character formed of a plurality of strokes has component vectors given by 32/(number of strokes) for each stroke. That is, the number of the component vectors is not changed by the length of the total strokes, but the number of the component vectors per one stroke is univocally determined by the number of strokes. At this time, a problem of decimal fraction arises for representing the number of the component vectors. To avoid this problem, the following processing is made by the program.

Take, for example, a handwritten input character "H" formed of three strokes. When three integers totaling 32 are assigned to them, if the number of component vectors for each stroke is calculated to its decimal fraction, $^{32}/_3$=10.667 is obtained. Then, if $^{32}/_3$ is multiplied by 1, 2, and 3 and the results are each rounded:

($^{32}/_3$)×1=10.667≈11

($^{32}/_3$)×2=21.333≈21

($^{32}/_3$)×3=32

Accordingly, the vector numbers are assigned to each stroke as follows:
 to the first stroke: 11 vectors, from the first to 11th
 to the second stroke: 10 vectors from the 12th to 21st (21−11=10)
 to the third stroke: 11 vectors from the 22nd to 32nd (32−21=11)

Figure 2:
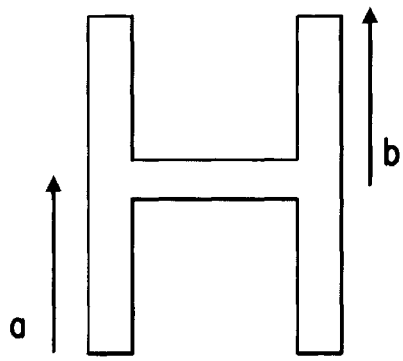
FIG. 2 is an explanatory drawing of a transition stroke employed in the invention.

FIG. 2 is an explanatory drawing of a transition stroke employed in the invention.

The transition stroke is a component vector obtained by extracting the direction of a floating movement of pen, off the paper, while a character is written. Although many handwritten input characters can be recognized by the ordinary strokes but some of them cannot be recognized thereby. Such unrecognizable characters are those having the same ordinary strokes but different shapes. This means that the handwritten character has characteristic features that cannot be represented by the ordinary strokes alone. By combining the ordinary strokes with the transition strokes, the rate of recognition of the handwritten input character is improved over that obtained when only the ordinary strokes are employed. The transition stroke exists in a character whose strokes is more than one and it is constituted of directional information of the imaginary handwritten stroke from the ending point of each stroke to the starting point of the next stroke. In the case of characters whose ordinary strokes are alike, by combining the same with the directional information of the transition strokes, the rate of recognition can be improved over that obtained when only the ordinary strokes are employed. The number of the transition strokes can be given by "number of strokes—1". In the case of the three-stroke character "H" shown in FIG. 2, there are:
 the component vector of the transition stroke going from the ending point of the first stroke to the starting point of the second stroke: a, and
 the component vector of the transition stroke going from the ending point of the second stroke to the starting point of the third stroke: b.

Figure 3A:
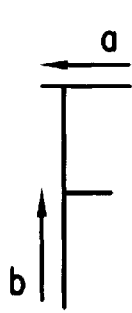
FIG. 3(a) and FIG. 3(b) are diagrams showing transition strokes different from each other.
Figure 3B:

FIG. 3(a) and FIG. 3(b) are drawings showing transition strokes different from each other.

In the case of "F" and "I", for example, the component vectors of the ordinary strokes from the first stroke to the third stroke are completely the same. While the directions of the first transition stroke a are the same, the directions of the second transition stroke b are quite different. Hence "F" and "I" can be discriminate by the difference in the second transition stroke. Thus, character recognition by making use of the feature that pen's movements in the air are different from character to character is made possible.

Figure 4:
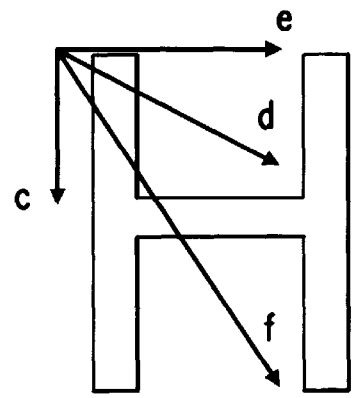
FIG. 4 is an explanatory drawing of an s-e stroke employed in the invention.

FIG. 4 is an explanatory drawing of a start-end stroke (s-e stroke) employed in the invention.

Figure 5A:
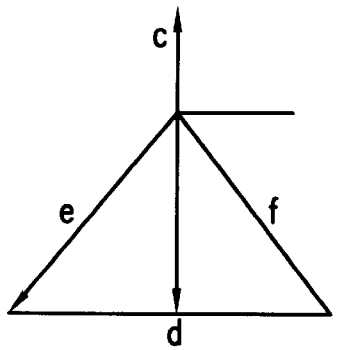
FIG. 5(a) and FIG. 5(b) are explanatory drawings of s-e strokes employed in the invention.
Figure 5B:
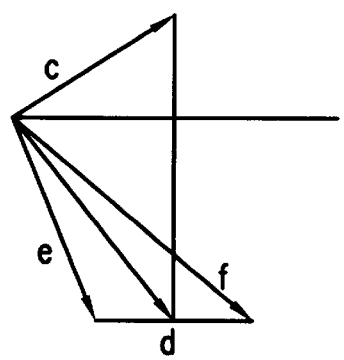

The s-e strokes of a handwritten input character are component vectors indicative of directional information from the starting point of the first stroke to the starting point and the ending point of each of the subsequent strokes. In the case of "H" shown in FIG. 4, there are:
 a component vector of the s-e stroke from the starting point of the first stroke to the starting point of the second stroke: c,
 a component vector of the s-e stroke from the starting point of the first stroke to the ending point of the second stroke: d,
 a component vector of the s-e stroke from the starting point of the first stroke to the starting point of the third stroke: e, and
 a component vector of the s-e stroke from the starting point of the first stroke to the ending point of the third stroke: f,
and employment of these are effective in recognizing a handwritten input character difficult to recognize only by the ordinary strokes or by two kinds of strokes of the ordinary strokes and the transition strokes. For example, although the Chinese characters shown in FIG. 5(a) and FIG. 5(b) whose ordinary strokes and the transition strokes are alike are difficult to discriminate, clear discrimination between them can be made by adding the s-e strokes as the component vectors indicative of the directional information from the starting point of the character to the starting point and ending point of each stroke, because the s-e strokes of both of the characters have considerably different directionalities.

Now, a method of recognizing anon-line handwritten input character employing a fuzzy associative memory of the invention will be described.

Figure 6:
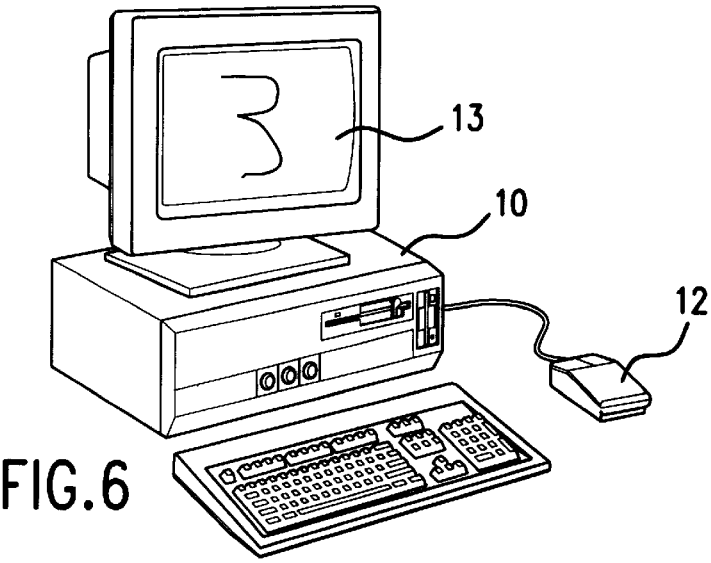
FIG. 6 is an explanatory drawing showing an example of the inputting method of a handwritten input character.
Figure 7:
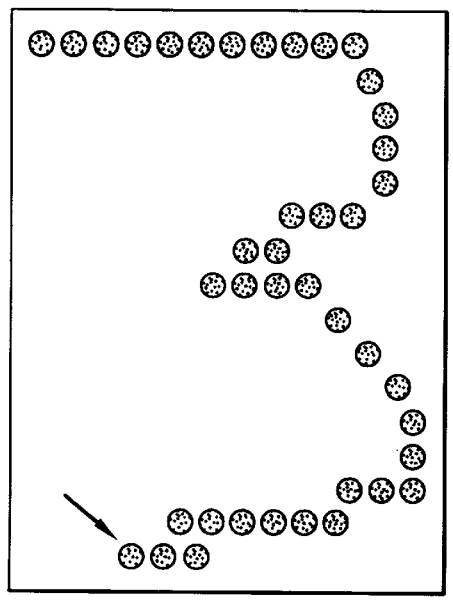
FIG. 7 is an explanatory drawing showing that a handwritten input character is formed of a string of dots.
Figure 8:
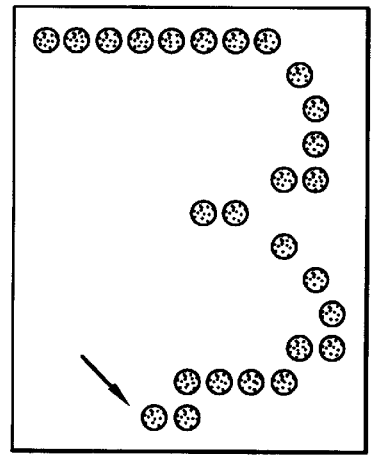
FIG. 8 is an explanatory drawing showing a case of handwritten input characters different in size.

On the CRT 13 of the personal computer 10 shown in FIG. 6, though the line constituting the handwritten input character written with the mouse 12 seems to be continuous, it, in reality, is formed of a string of dots as shown in FIG. 7. Since the data of these dots are all coordinate data, they include dot-to-dot distance data, i.e., information of the size of the character. Accordingly, even if the same characters are written, they may have various sizes depending on the persons who write the character and environmental conditions when the character is written. An example of a character having a different character size is shown in FIG. 8. In handwritten input character recognition, even if the character sizes are different, the same result of recognition must of course be output for the same character. In order to deduce the same result of recognition even if the character sizes are different, it becomes necessary to convert the coordinate data into angular data. The method to achieve it will be shown below.

Figure 9:
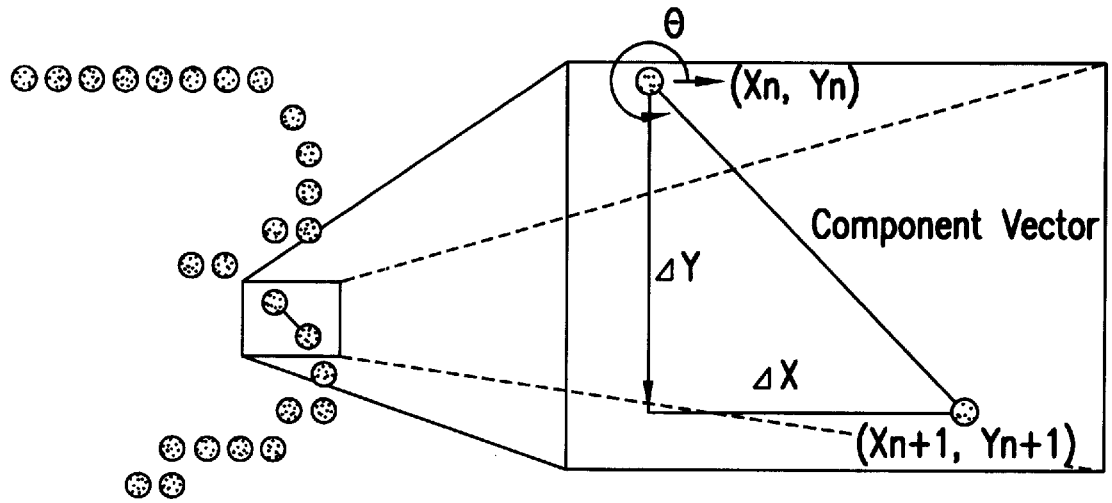
FIG. 9 is an explanatory drawing of the absolute angle $\theta$ of a component vector.

A handwritten input character formed of a string of dots is divided into a plurality, 32 in the present example, of segments so as to be replaced with 32 dots in all. Then, the absolute angle of the straight line connecting adjoining dots is calculated. The straight line connecting two dots is formed by obtaining $\Delta X$ and $\Delta Y$ (refer to FIG. 9) on the basis of the coordinate data of the dots. The straight line having a directionality is the component vector and to deduce its absolute angle $\theta$, equations (1)–(4) are used:

$$\theta = \arctan |\Delta Y/\Delta X| (\Delta x>0, \Delta y>0) \quad (1)$$

$$\theta = 180° - \arctan |\Delta Y/\Delta X| (\Delta x<0, \Delta y>0) \quad (2)$$

$$\theta = 180° + \arctan |\Delta Y/\Delta X| (\Delta x>0, \Delta y>0) \quad (3)$$

$$\theta = 360° - \arctan |\Delta Y/\Delta X| (\Delta x>0, \Delta y<0) \quad (4)$$

Then, the calculated angle is divided into the fuzzy vector ("0": in the direction of angle 0°, "1": in the direction of angle 90°, "2": in the direction of angle 180°, and "3": in the direction of angle 270°). The fuzzy vector represents an angle $\theta$ using membership grades (the variable is represented by $\mu$) in four directions and the membership grades are obtained from equations (5), (6) and in accordance with Table 1:

$$\mu_A = 1 - \theta/90° \quad (5)$$

$$\mu_B = \theta/90° \quad (6)$$

TABLE 1

| | Grade | | | |
|---|---|---|---|---|
| Angle | $\mu_0$ | $\mu_1$ | $\mu_2$ | $\mu_3$ |
| 0 ≤ θ ≤ 90° | $\mu_A$ | $\mu_B$ | 0 | 0 |
| 90° < θ ≤ 180° | 0 | $\mu_B$ | $\mu_A$ | 0 |
| 180° < θ ≤ 270° | 0 | 0 | $\mu_B$ | $\mu_A$ |
| 270° < θ ≤ 360° | $\mu_A$ | 0 | 0 | $\mu_B$ |

Figure 10:
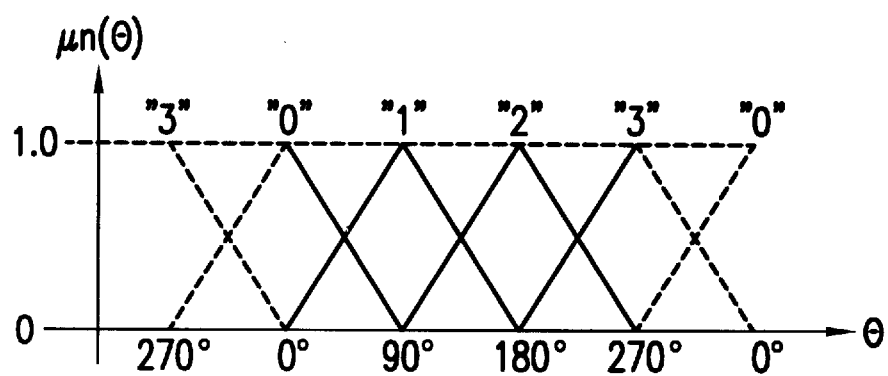
FIG. 10 is an explanatory drawing of the membership function representing the relationship between the absolute angle $\theta$ of a component vector and the membership grades.

The function representing the relationship between the membership grades in the four directions and $\theta$ is called the membership function and it is shown in FIG. 10. Portions indicated by broken lines in FIG. 10 are duplicated and the function is continuously shown within the range of 0°–360°. An example of practically obtaining four fuzzy vectors from a component vector is shown in FIG. 11–FIG. 14.

Figure 11:
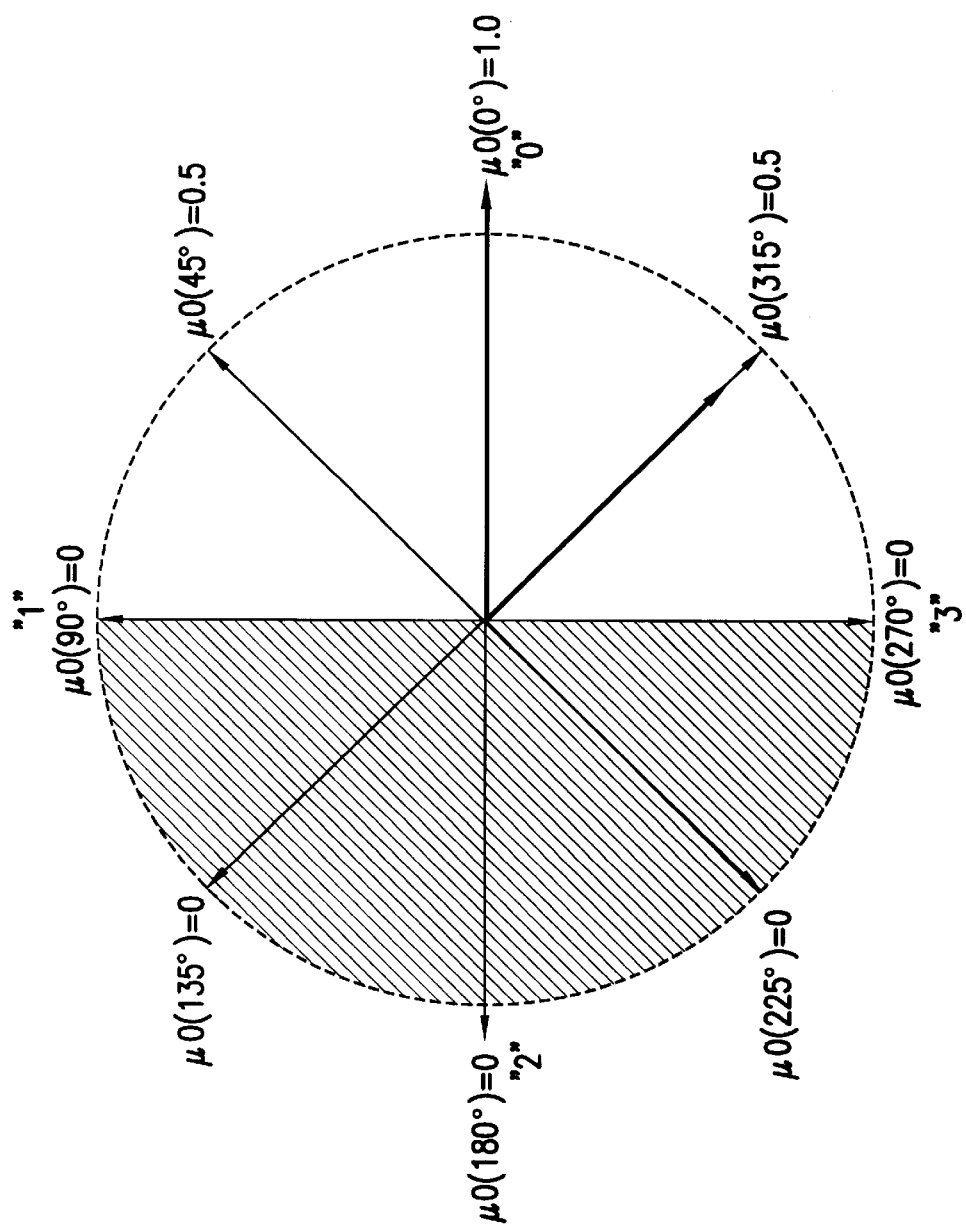
FIG. 11 is an explanatory drawing showing the relationship between a component vector and its membership grade in the direction "0".

FIG. 11 shows the relationship between the component vector and the membership grade in the case of the direction "0". The hatched portion expresses the region where the membership function becomes 0.

Figure 12:
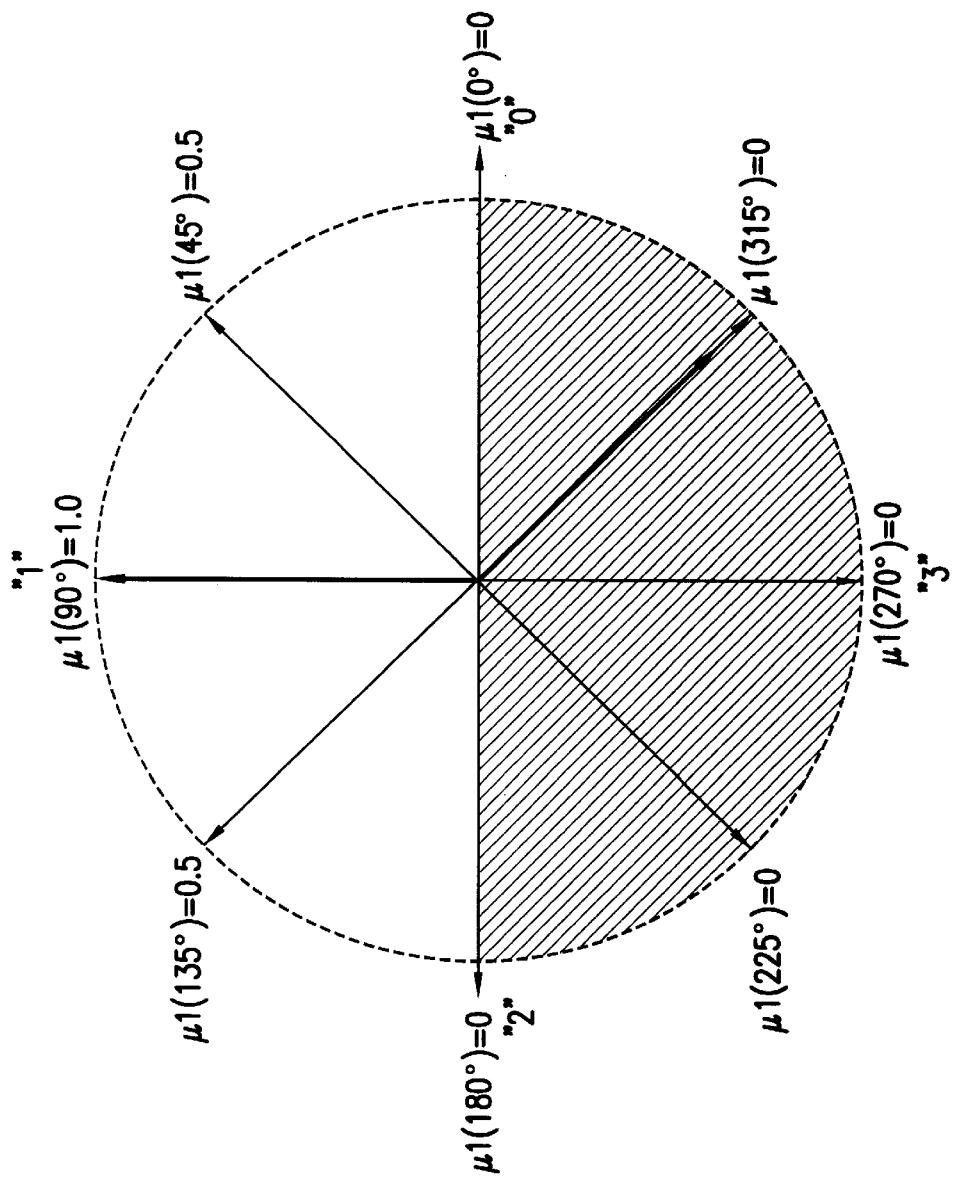
FIG. 12 is an explanatory drawing showing the relationship between a component vector and its membership grade in the direction "1".
Figure 13:
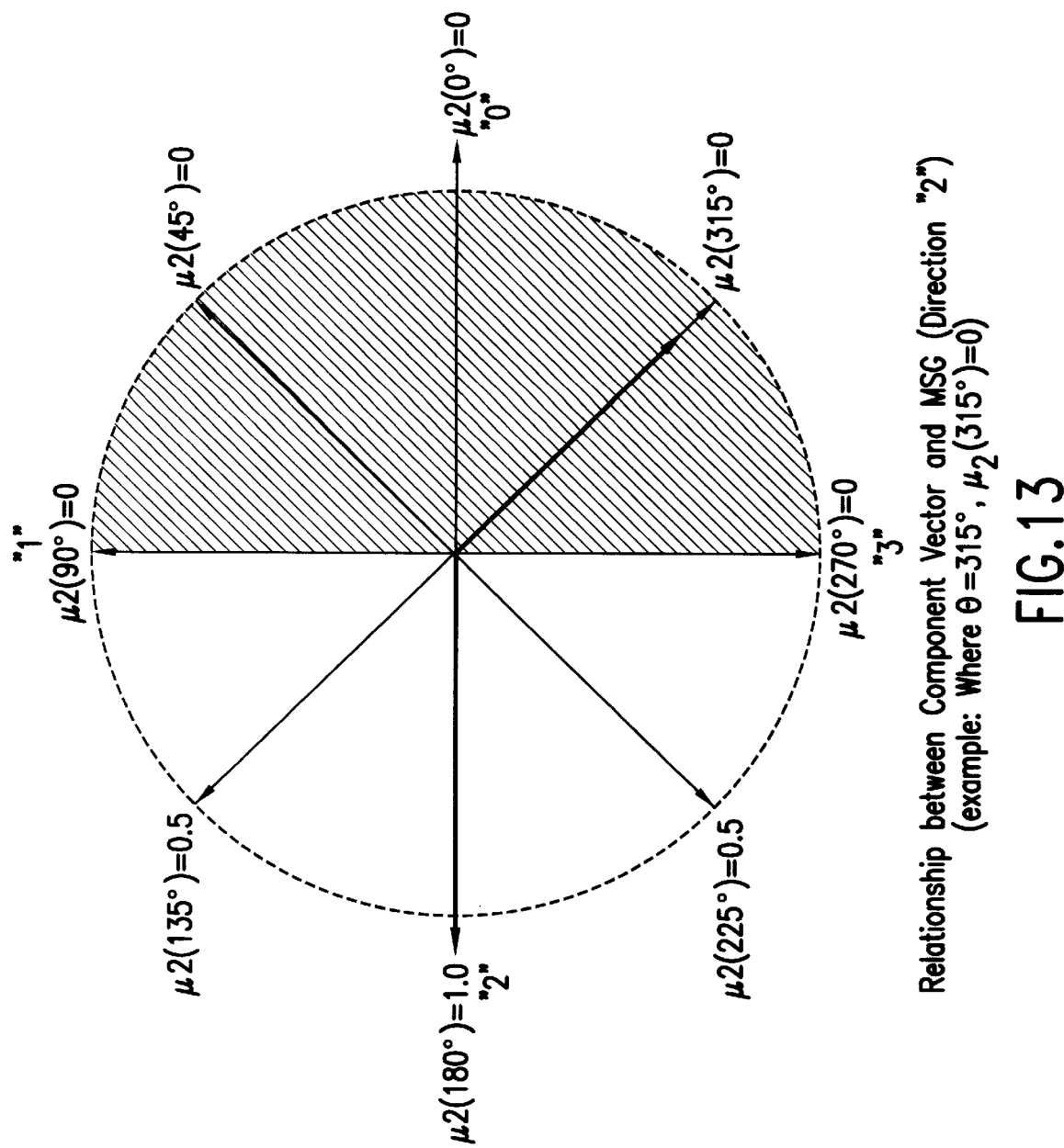
FIG. 13 is an explanatory drawing showing the relationship between a component vector and its membership grade in the direction "2".
Figure 14:
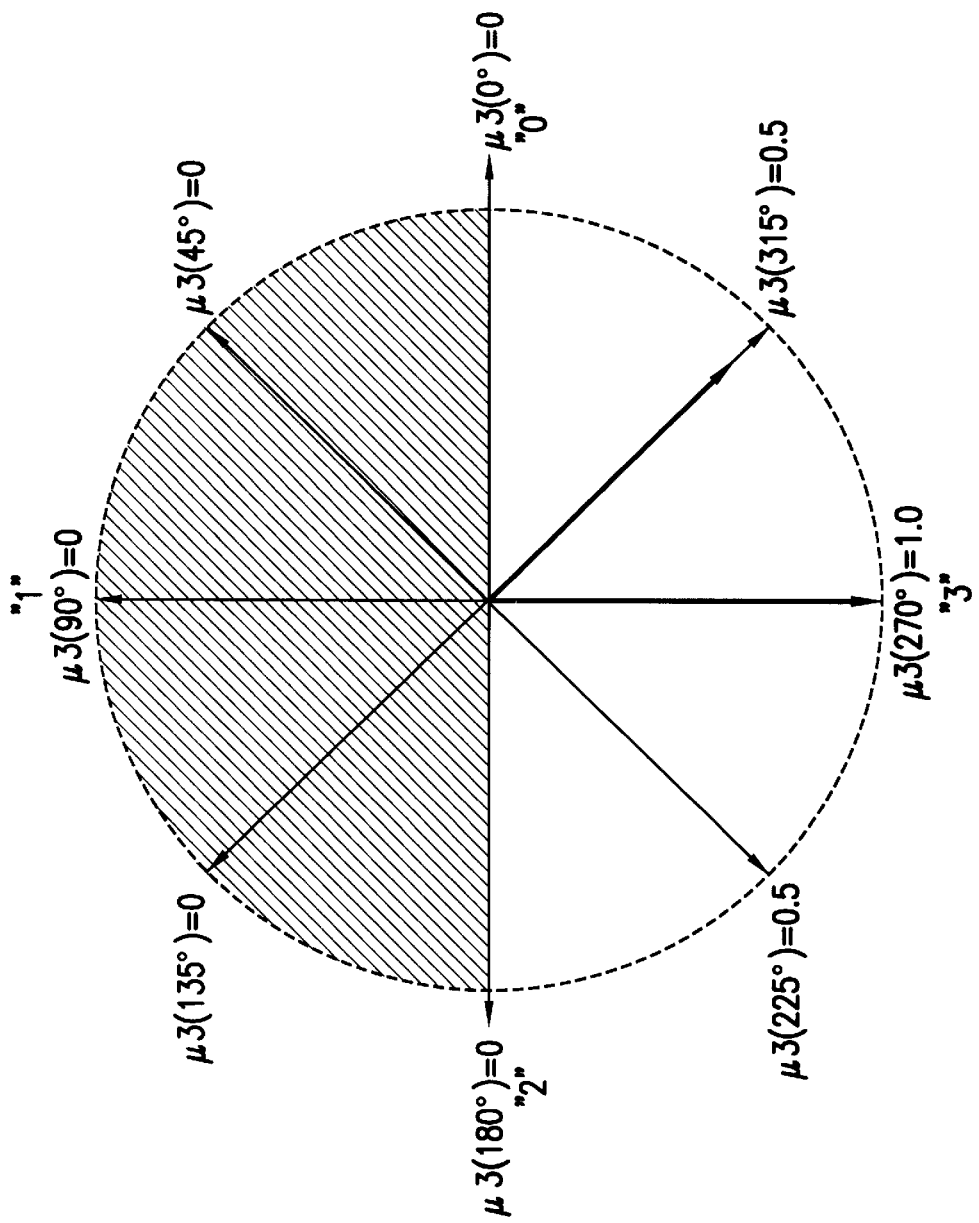
FIG. 14 is an explanatory drawing showing the relationship between a component vector and its membership grade in the direction "3".

FIG. 12–FIG. 14 similarly show the relationships between the component vector and the membership grades in the directions "1", "2", and "3", respectively. The hatched portions express the regions where the membership grade becomes 0.

Figure 15:
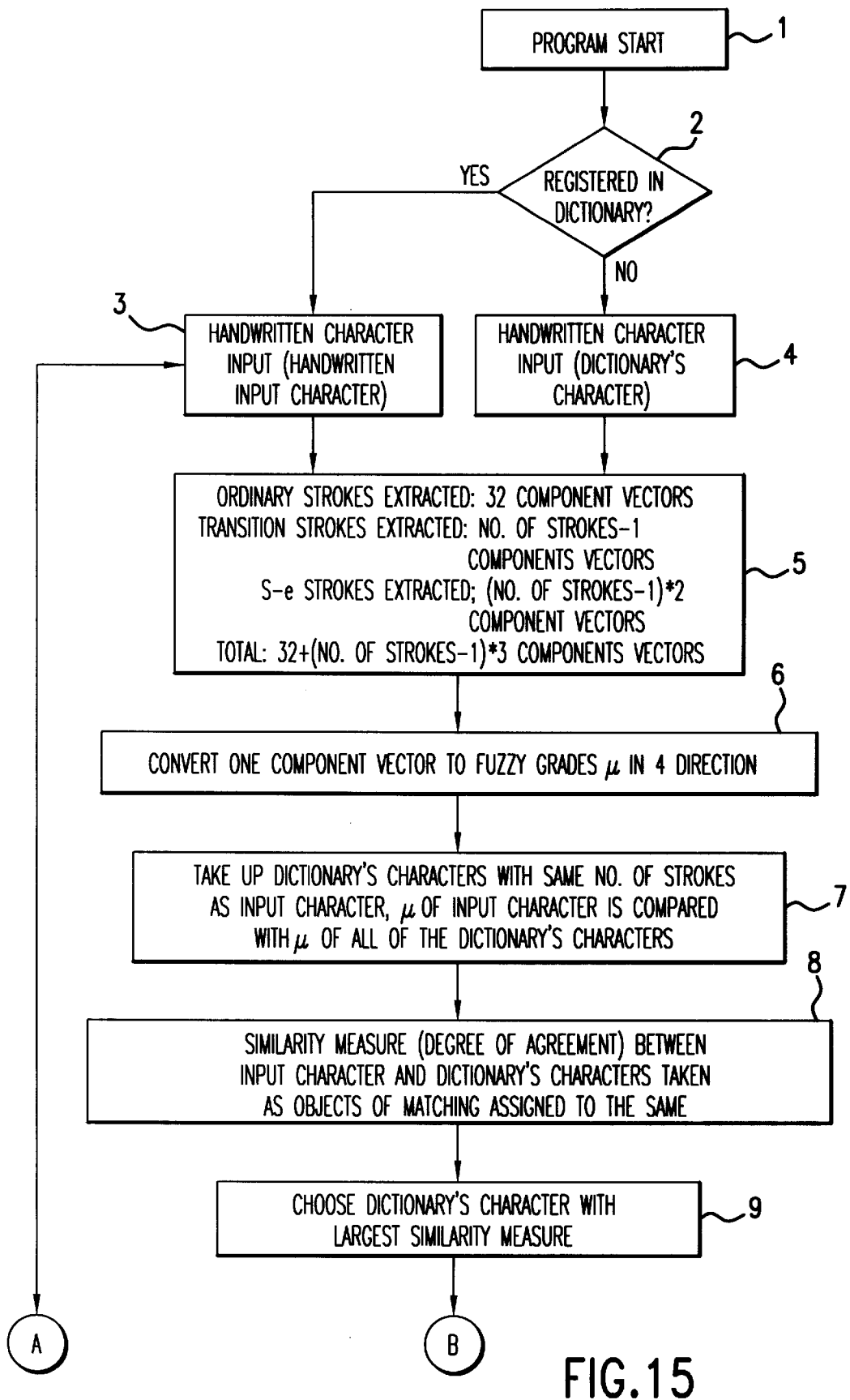
FIG. 15 is a flowchart showing the handwritten input character recognition system of the invention.
Figure 16:
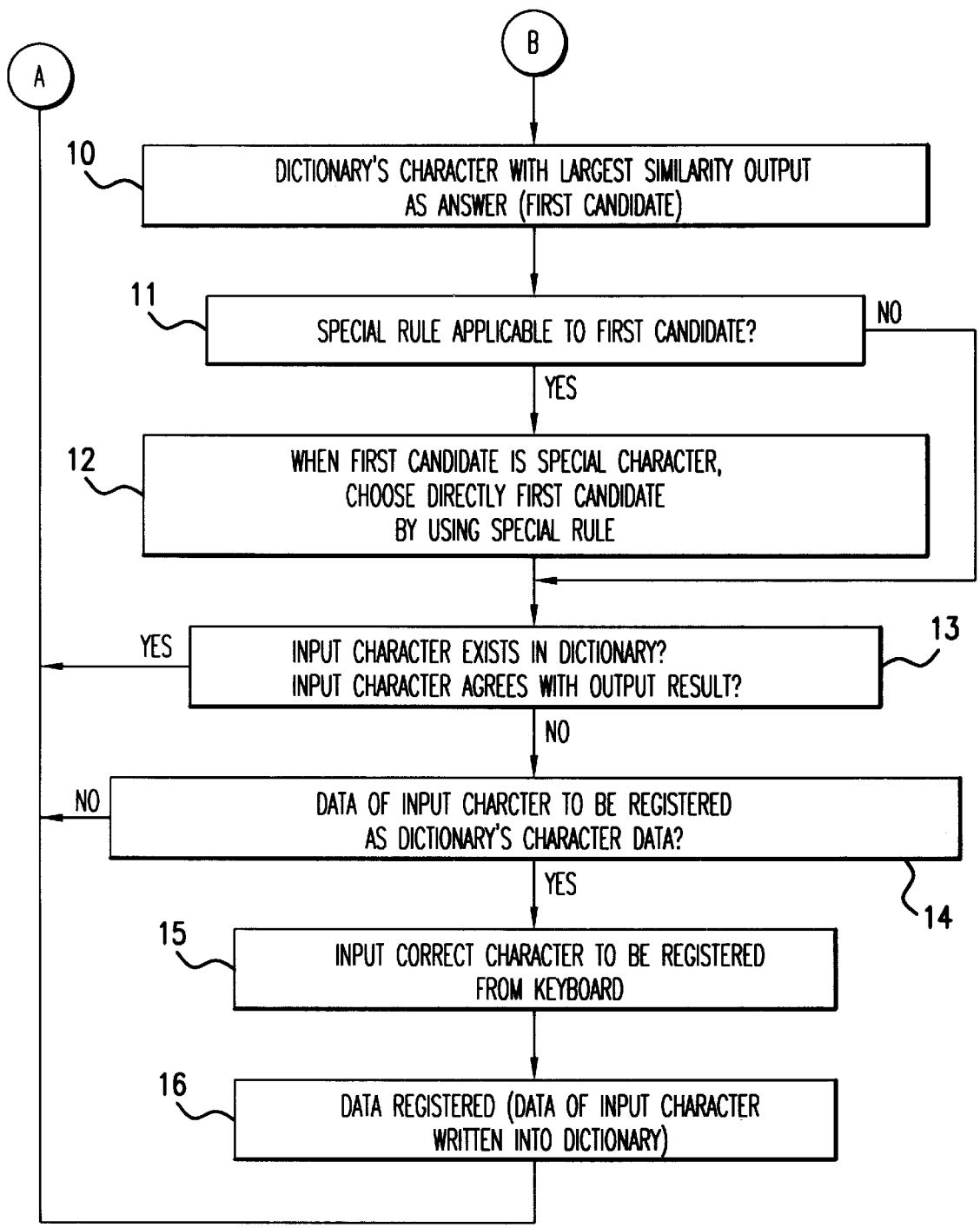
FIG. 16 is a flowchart showing the handwritten input character recognition system of the invention.

FIG. 15 and FIG. 16 are flowcharts showing a system of handwritten input character recognition of the invention.

Step 1

The program is started

Step 2

It is determined whether the handwritten character about to be input is already registered in the dictionary.

Step 3

If it is already registered in the dictionary, the handwritten input character is input as an input character.

Step 4

If it is not yet registered in the dictionary, the handwritten input character is input as a character to be registered in the dictionary.

Step 5

From ordinary strokes, transition strokes, and s-e strokes of the handwritten input character, their respective component vectors are extracted.

Step 6

Each of the extracted component vectors is converted into a fuzzy vector consisting of four membership grades.

Obtaining four membership grades $\mu_0, \mu_1, \mu_2,$ and $\mu_3$ from equations (1)–(4), the absolute angle $\theta$ is obtained from equations (5) and (6) and in accordance with Table 1.

Through the above described procedures, four membership grades $\mu_0, \mu_1, \mu_2,$ and $\mu_3$ are output from one component vector and all of the patterns of the membership grades $\mu_0, \mu_1, \mu_2,$ and $\mu_3$ are stored in memory.

Step 7

Taking up, as the objects, the dictionary's characters with the same number of strokes as the handwritten input character, the membership grades of the handwritten input character obtained in step 6 are matched with membership grades of all of the dictionary's characters to thereby calculate similarity measure between the input character and the dictionary's characters.

In executing the character recognition, such a method as to use the ratio between the areas formed by two-dimensionally represented fuzzy vectors is used. The similarity measure S is obtained through the following procedures. First, the similarity measure $S_c$ on all of the component vectors is obtained from the following equation $$S_c = \frac{\sum_{i=0}^{3} \min(\mu_{Ti}, \mu_{Di})}{\sum_{i=0}^{3} \max(\mu_{Ti}, \mu_{Di})} \quad (7)$$

where $\mu_{T0}, \mu_{T1}, \mu_{T2},$ and $\mu_{T3}$ represent the membership grades of the component vector of the input character and $\mu_{D0}, \mu_{D1}, \mu_{D2},$ and $\mu_{D3}$ represent the membership grades of the component vectors of the dictionary's character.

In the above equation, max is the larger of the two values compared, and min is the smaller of the two values compared.

Then, similarity measure on each of the strokes is obtained from the following equations. The similarity measure SOR on the ordinary stroke is given by the following equation $$S_{OR} = \frac{\sum_{i=1}^{32} S_{COR}}{32} \quad (8)$$

where $S_{COR}$ represents the similarity measure on the component vector of the ordinary stroke.

The similarity measure $S_{TR}$ on the transition stroke is given by the following equation $$S_{TR} = \frac{\sum_{i=1}^{D-1} S_{CTR}}{D-1} \quad (9)$$

where $S_{CTR}$ represents the similarity measure on the component vector of the ordinary stroke and D is the number of strokes.

The similarity measure SSE on the s-e stroke is given by the following equation $$S_{SE} = \frac{\sum_{i=1}^{(D-1) \times 2} S_{CSE}}{(D-1) \times 2} \quad (10)$$

where $S_{CSE}$ represents the similarity measure on the component vector of the s-e stroke.

Figure 17:
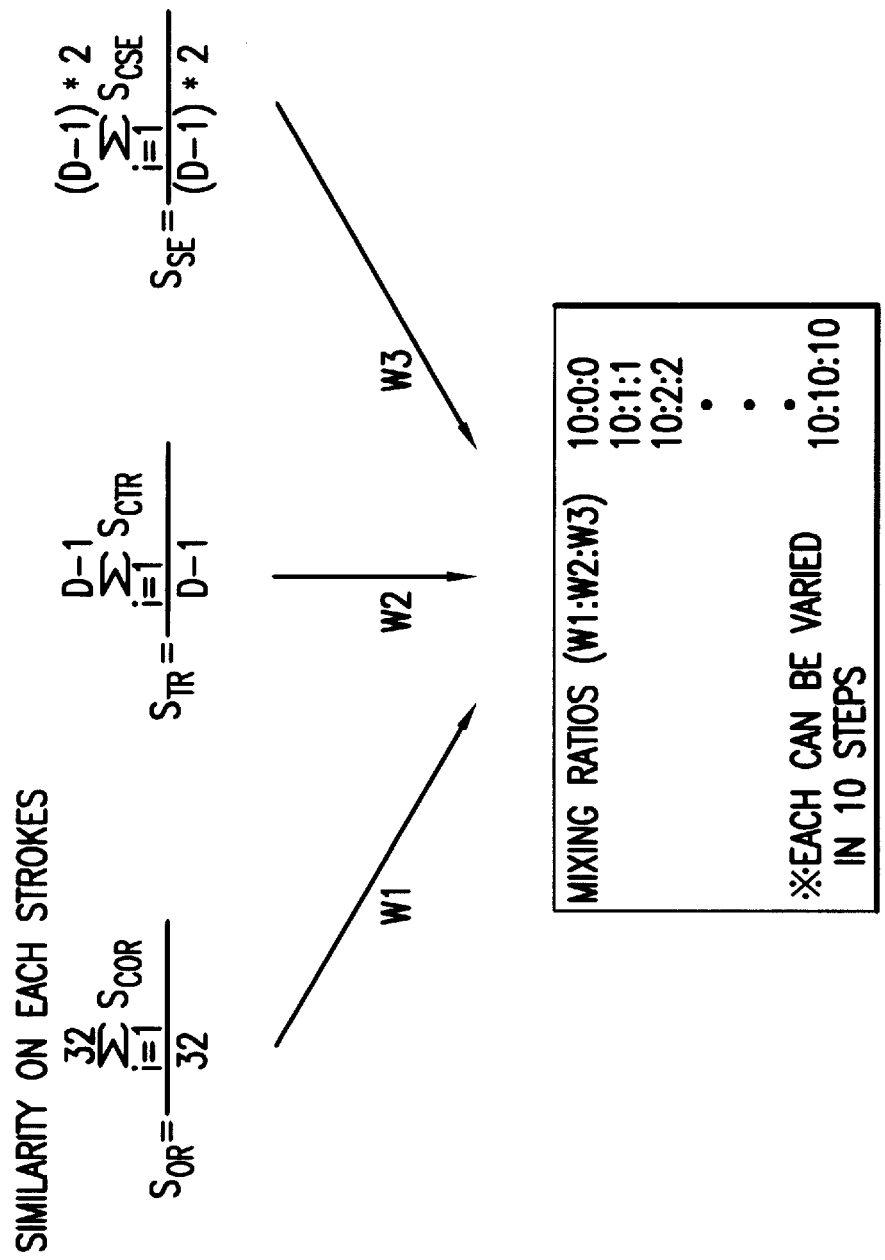
FIG. 17 is an explanatory drawing of the way to obtain similarity measures.

The similarity measure S is obtained from the weighted average of the similarity measures on each of the strokes. As to the mixing ratios (W1:W2: W3), the weighting factors of each of the strokes can be varied in 10 steps as shown in FIG. 17.

$$S = \frac{W1 \times S_{OR} + W2 \times S_{TR} + W3 \times S_{SE}}{W1 + W2 + W3} \quad (11)$$

Step 8

The calculation of the similarity measure in Step 7 is carried out for all of the dictionary's characters and the results are assigned to all of the dictionary's characters.

Step 9

The one having the largest similarity measure in Step 8 is chosen.

Step 10

The largest similarity measure is extracted from the dictionary and the character with the largest similarity measure is output as an answer (the first candidate).

Step 11

When the character output as the first candidate through the procedures up to Step 10 is such a character that is liable to be mistaken for another character because of quite similar strokes, for example "0" and "6", determination is made in accordance with a special rule regardless of the result of the extraction according to the similarity.

Step 12

Figure 18:
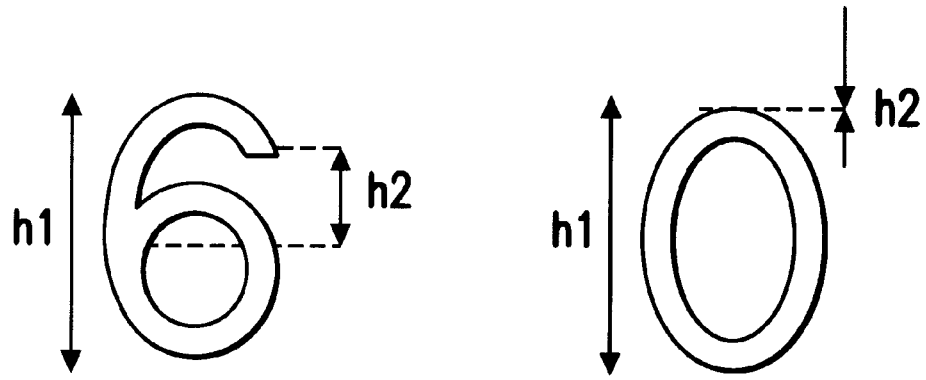
FIG. 18 is an explanatory drawing of a special rule.

FIG. 18–FIG. 21 are explanatory drawings of special rules. FIG. 18 shows the case of "0" and "6", according to which, if the height h2 of the starting point from the ending point is greater than ¼ of the height h1 of the character, the character is recognized as "6" and, if it is smaller than ¼, the character is recognized as "0".

Figure 19:
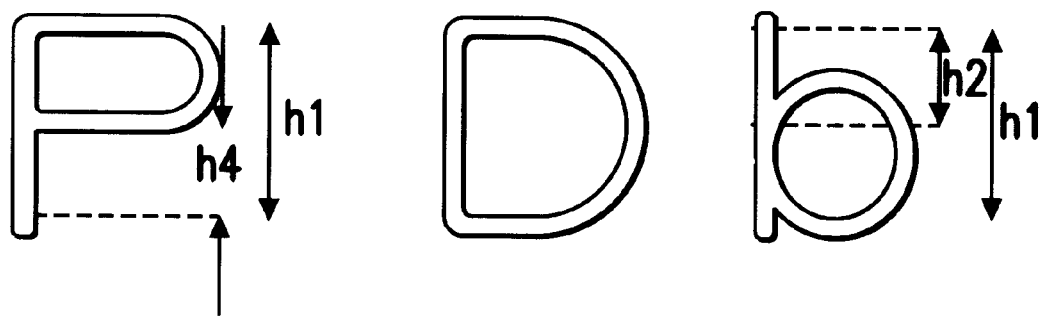
FIG. 19 is an explanatory drawing of a special rule.

FIG. 19 shows the case of "P", "D", and "b", according to which, if the height h2 of the starting point of the second stroke from the starting point of the first stroke is greater than the height h1 of the character, the character is recognized as "b" and, if the height h4 of the ending point of the second stroke from the ending point of the first stroke is greater than ¹⁄₁₀ of the height of the character, the character is recognized as "P", and otherwise, the character is recognized as "D".

Figure 20:
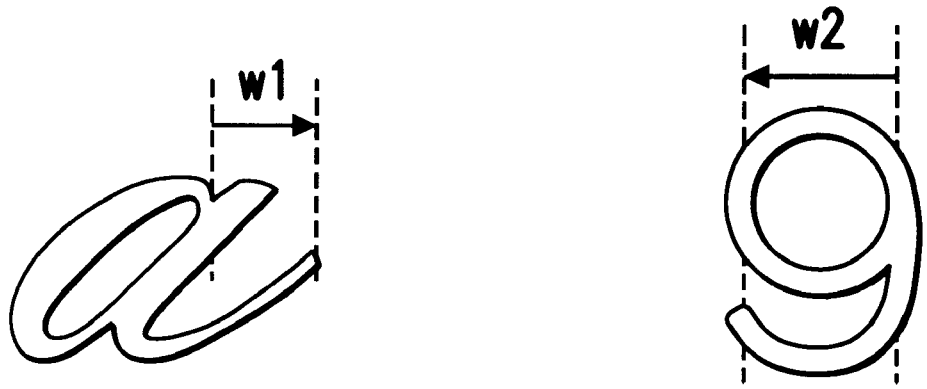
FIG. 20 is an explanatory drawing of a special rule.

FIG. 20 shows the case of "9" and "a", according to which, if the distance (in the horizontal direction) w1 of the ending point referenced from the starting point is greater than +8 dots (the rightward direction is taken as the positive direction), the character is recognized as "a" and, if it is smaller than 8 dots, the character is recognized as "9". Also, when the value obtained by dividing the distance between the starting point and the ending point in the vertical direction by the distance between the starting point and the ending point in the horizontal direction is greater than 15, the character is recognized as "9".

Figure 21:
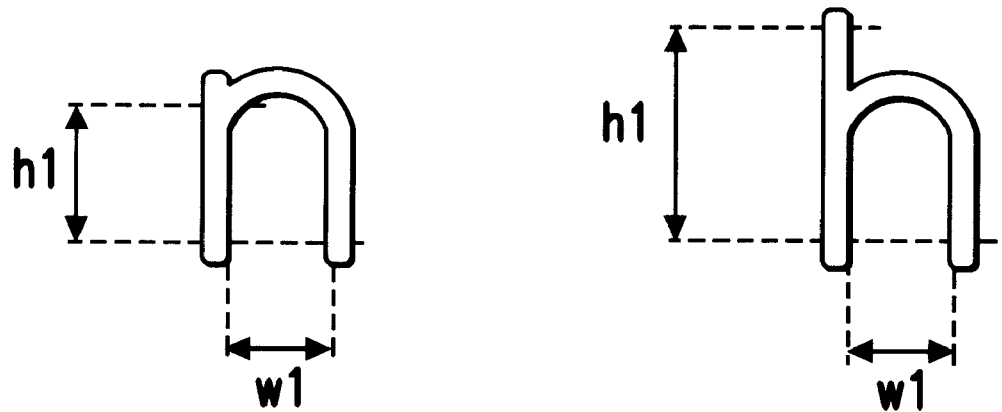
FIG. 21 is an explanatory drawing of a special rule.

FIG. 21 shows the case of "n" and "h", according to which, the value obtained by dividing the distance h1 between the starting point and the ending point in the vertical direction by the distance w1 between the starting point and the ending point in the horizontal direction is greater than 1.5, the character is recognized as "h" and, if it is smaller than 1.5, the character is recognized as "n".

Thus, a wide variety of character recognition can be made on Chinese characters, HIRAGANAs, KATAKANAs, numerals, alphabetical (capital and small) letters and symbols.

Step 13

Whether the handwritten input character and the output result are in agreement is determined by visual examination.

Step 14

When the handwritten input character is not present as the dictionary's data, it is determined whether or not the character is to be registered.

Step 15

When it is to be registered, the correct character to be registered is input from the keyboard.

Step 16

The input character data (fuzzy vector group) and the character to be registered are registered by automatic writing.

Figure 25:
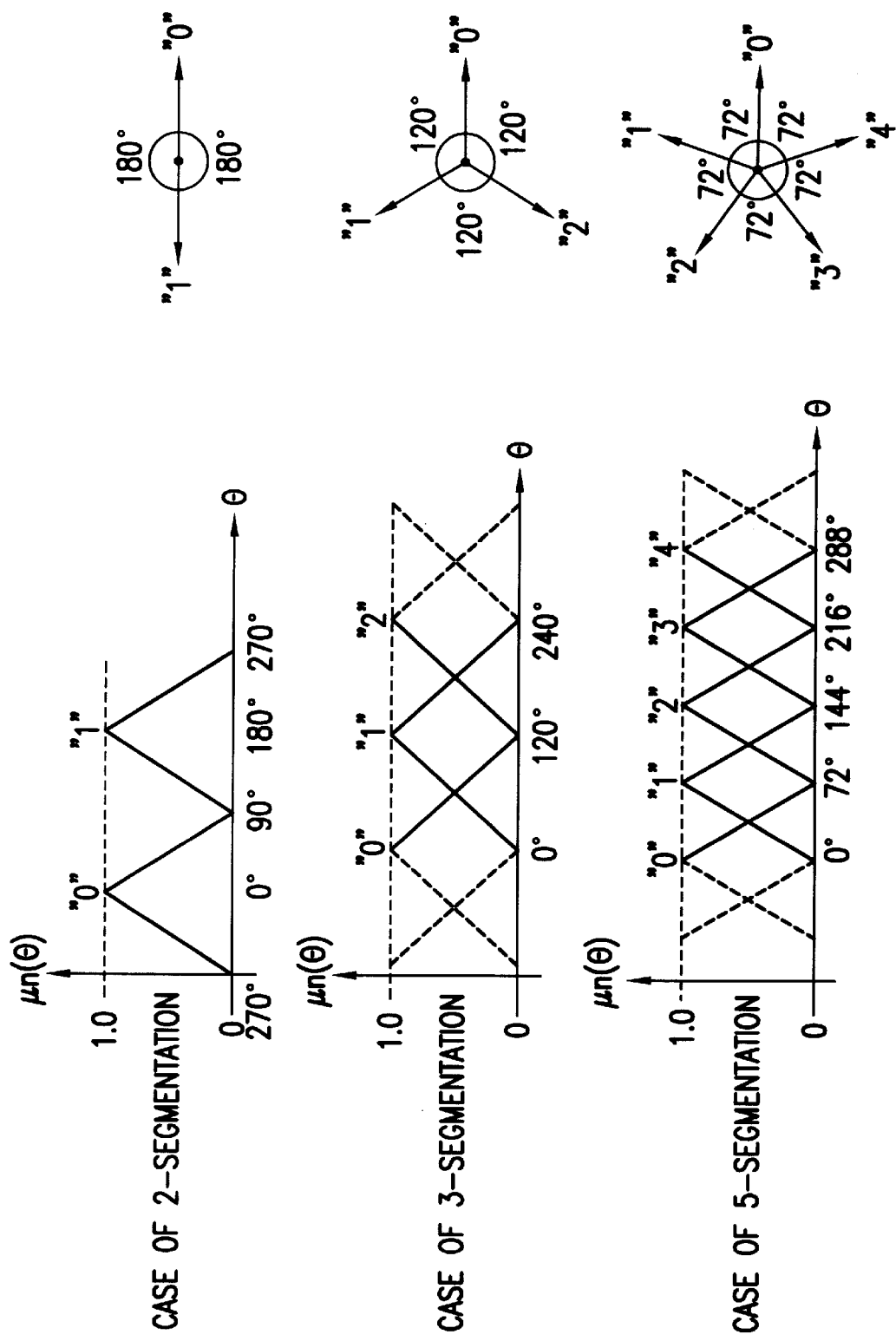
FIG. 25 shows explanatory drawings of the membership functions showing relationships between the absolute angle $\theta$ and the membership grades when fuzzy vector in two directions, in three directions, and in five directions are used.

In the above embodiment, the case where the component vector of a handwritten input character was converted into a fuzzy vector in four directions was shown, the component vector can be converted into a fuzzy vector in two, at least, directions. Membership functions indicating relationships of the absolute angle θ, where fuzzy vector in two directions, in three directions, and five directions are used, to the membership grades are shown in FIG. 25.

Figure 22:
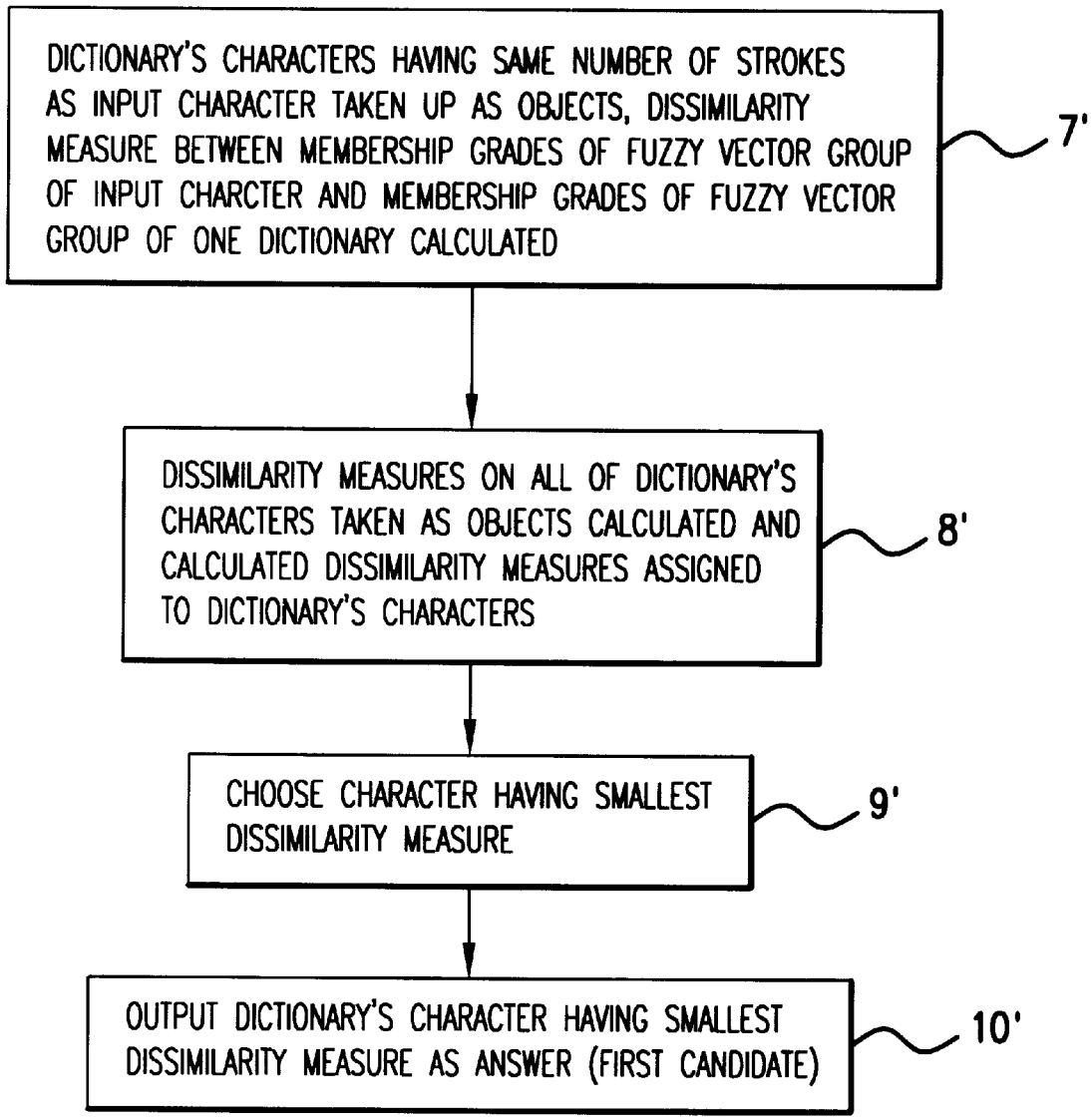
FIG. 22 is a flowchart showing a character recognition method through calculation of a dissimilarity measure.

Further, while the case where the method of character recognition was made through comparison of the similarity measure was mentioned in the above described embodiment, it can also be made through comparison of a dissimilarity measure. The pertinent example is shown in FIG. 22.

Up to step 6, the same method as in the calculation with the use of the similarity measure is used.

Step 7'

Taking up, as the objects, the dictionary's characters having the same number of strokes as the input character, a dissimilarity measure between the membership grades of the fuzzy vector group of the input character and the membership grades of the fuzzy vector group of one of the dictionary's characters is calculated. The dissimilarity measure here means the degree of difference, i.e., according as it is closer to zero, the both are more alike. As the dissimilarity measure, there is the Hamming distance which is the integral of the differences between each set of the membership grades, the Euclidean distance which is the distance for each of the membership grades, or the DP matching.

Step 8'

The dissimilarity measures on all of the dictionary's characters taken as the objects are calculated and the calculated dissimilarity measures are assigned to the dictionary's characters.

Step 9'

The character having the smallest dissimilarity measure is chosen from the dictionary's characters.

Step 10'

The dictionary's character having the smallest dissimilarity measure is output as the answer (first candidate).

From Step 11 on, the same methods as in the algorithm employing the similarity measure are used.

Figure 23:
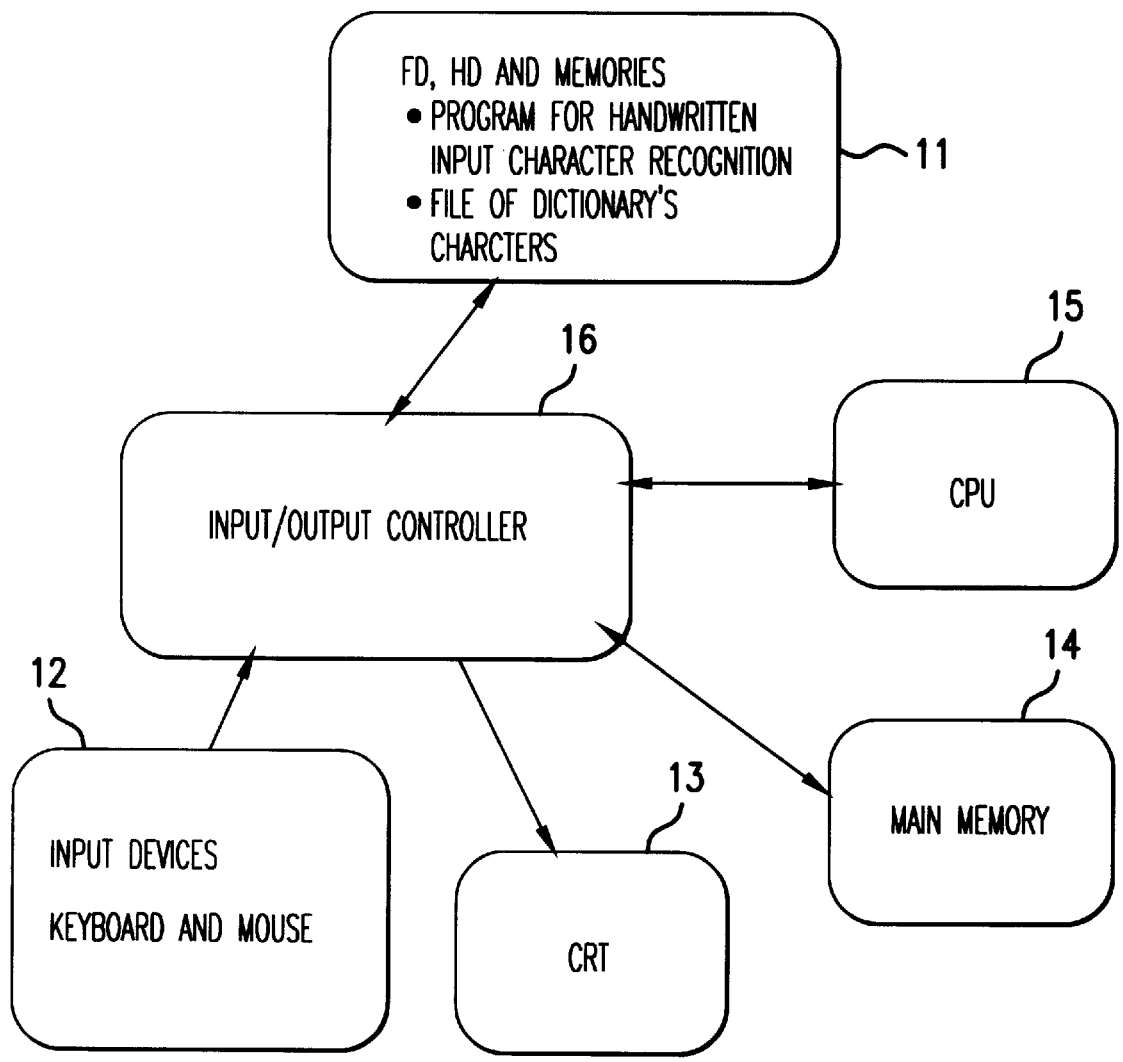
FIG. 23 is a block diagram showing a configuration of the computer for carrying out the invention.

An example of the configuration of the apparatus for character recognition according to the invention is shown in FIG. 23.

FIG. 23 is a block diagram showing the configuration of a computer for carrying out the above described procedures in FIG. 15 and FIG. 16. The apparatus comprises a recording medium (FD, HD, auxiliary memory, or the like) 11 in which a handwritten input character recognition program and a dictionary's character data file are recorded, an input device for inputting the handwritten input character (a mouse or pad and a keyboard) 12, a display (CRT) 13 for displaying thereon the input character and the dictionary's character recognized as the input character, a main memory 14 for temporarily storing stroke data of the handwritten input character, stroke data of the dictionary's characters, and the similarity measure on each of the dictionary's characters, a CPU 15 performing such operations as data conversion of stroke data into data of fuzzy vector group, calculation of similarity measures, and the like, and an input/output controller 16 for controlling data transmission between devices and issuance of program commands.

For the recording medium 11, input device 12, memory 14, display 13, CPU 15, and the input/output controller 16, a general purpose personal computer may be used and, for the program, a general purpose program such as PASCAL may be used. Further, when a pad type device is used for the input device 12, a general purpose input pad for a personal computer capable of inputting coordinates on-line may be used.

The character recognizing procedures carried out in the apparatus for character recognition are as follows:

(1) The handwritten input character recognition program is read out of the hard disk as the recording medium 11 onto the memory 14 and the program is started.

(2) The range within which characters are input and the position of the cursor are displayed on the CRT 13 and handwritten characters are input by moving the mouse cursor with the mouse's left button clicked.

At this time, the movement of the mouse with its left button clicked is displayed on the CRT 13 and, at the same time, the loci of the coordinate data of the mouse cursor while the mouse is left-clicked, number-of-stroke data obtained by counting the times of left-clicking of the mouse, and starting and ending coordinate data indicative of the points where the left-clicking is started and ended are stored in the memory 14.

When a pad is used as the input device, the loci of the coordinate data of the pen while it is held in contact with the pad, number-of-stroke data obtained by counting the times of the pen touching the pad, and starting and ending coordinate data indicative of the points where the pen's contact is started and ended are stored in the memory 14.

(3) By right-clicking the mouse, the portion of the program related to the recognition is operated.

(4) The number of the component vectors of the ordinary stroke of each stroke is calculated from the number-of-stroke data, the addresses of the coordinate data at the starting and ending points of each stroke are calculated from the starting and ending coordinate data, $\varDelta X$ and $\varDelta Y$ of 32 component vectors of the ordinary stroke are calculated by dividing each stroke by the number of the component vectors, and the absolute angle $\theta$ of each component vector is calculated and stored in the memory.

Further, the absolute angle $\theta$ of the component vectors of the transition stroke and the s-e stroke are calculated from the starting and ending coordinate data stored in the memory and the results are stored in the memory.

All of the aforesaid calculation and the following calculation are made in the CPU 15 with the use of the handwritten input character recognition program.

(5) Four fuzzy grades of each component vector are calculated from the absolute angle $\theta$ of each component vector stored in the memory 14 and the fuzzy vector group of each component vector and the number-of-stroke data are stored in the memory.

(6) The dictionary's characters having the same number of strokes as the handwritten input character and the related fuzzy vector groups are read out of the dictionary's character data file stored in the hard disk and stored into the memory 14.

(7) The similarity measure between the fuzzy vector group of each of the dictionary's characters and the fuzzy vector group of the handwritten input character stored in the memory 14 is calculated, the calculated results are assigned to the respective dictionary's characters, and the thus obtained data are stored in the memory 14.

(8) The dictionary's characters stored in the memory 14 are sorted in descending order of similarity measure in the CPU 15 and they are stored in the memory 14 in descending order of similarity measure.

(9) The dictionary's character stored at the top as the result of the sorting is chosen as the first candidate and it is checked if the first candidate character corresponds to a character to which a special rule in the handwritten input character recognition program stored in the memory is applicable.

(10) Unless the first candidate character corresponds to a character to which a special rule is applicable, the first candidate character is displayed on the CRT as the result of the recognition.

(11) When the first candidate character corresponds to a character to which a special rule is applicable, the first candidate character is obtained by calculation according to the program of the special rule included in the handwritten input character recognition program by using the coordinate data, number-of-stroke data, starting and ending coordinate data, and the smallest value and largest value of the coordinate data in X direction and Y direction stored in the memory, and the thus obtained first candidate character is stored in the memory and also displayed on the CRT as the result of the recognition.

(12) A command to determine the character is input from the keyboard or mouse and thus the character is determined.

What is claimed is:

1. A method of on-line input handwritten character recognition for recognizing individual handwritten characters each formed by ordinary strokes sampled on-line, wherein the ordinary strokes of a handwritten character are strokes defined by continuous pen movement on a writing surface from a position whereat the pen is placed on the writing surface to a position whereat the pen is lifted from the writing surface, comprising the steps of:

converting each of said ordinary strokes of a handwritten character into component vectors having absolute angles representing directional information;

determining and converting transition strokes of the handwritten character, defined by pen movement, off a writing surface, from an end of an ordinary stroke to a beginning of a next ordinary stroke of the handwritten character, into component vectors having absolute angles representing directional information;

determining and converting start-end strokes of the handwritten character, defined by pen movement from a starting point of a first ordinary stroke to starting points and ending points of each of subsequent ordinary strokes of the handwritten character, into component vectors having absolute angles representing directional information;

dividing said absolute angles into a group of fuzzy vectors for the handwritten character indicative of reference directions;

converting said fuzzy vectors into membership grades of a plurality of directions representing similarity measures respectively corresponding to said reference directions by using a predetermined membership function;

calculating one of a similarity measure and a dissimilarity measure between the group of fuzzy vectors described with said converted membership grades and character data from dictionary data described with a fuzzy vector group respectively corresponding to component vectors of ordinary strokes and at least one of transition strokes and starting-end strokes previously registered in the dictionary; and choosing a character from the dictionary data corresponding to said handwritten character based on one of the similarity measure being the greatest and the dissimilarity measure being the smallest.

2. The method according to claim 1, further comprising the steps of:

determining whether the chosen character is one of a predetermined set of characters; and applying a proportionality rule to determine which of a group of characters, associated with said chosen character, corresponds to the input character if the chosen character is one said predetermined set.

3. The method according to one of claims 1 and 2, further comprising the steps of:

determining that said one of said similarity measure and said dissimilarity measure of said chosen character does not conform to a threshold indicating that there is no character data in the dictionary data corresponding to the handwritten character; and inputting a visually determined correct character and registering the group of fuzzy vectors described with said converted membership grades of said handwritten character as dictionary data corresponding to said correct character.

4. A handwritten character recognition apparatus for recognizing individual handwritten characters each formed by ordinary strokes sampled on-line, wherein the ordinary strokes of a handwritten character are strokes defined by continuous pen movement on a writing surface from a position whereat the pen is placed on the writing surface to a position whereat the pen is lifted from the writing surface, comprising:

a handwritten character input device for inputting handwritten characters and sampling a handwritten character to produce sample data;

means for converting said sample data of each of said ordinary strokes of a handwritten character into component vectors having absolute angles representing directional information;

means for determining and converting transition strokes of the handwritten character, defined by pen movement, off a writing surface, from an end of an ordinary stroke to a beginning of a next ordinary stroke of the handwritten character, into component vectors having absolute angles representing directional information;

means for determining and converting start-end strokes of the handwritten character, defined by pen movement from a starting point of a first ordinary stroke to starting points and ending points of each of subsequent ordinary strokes of the handwritten character, into component vectors having absolute angles representing directional information;

means for dividing said absolute angles into a group of fuzzy vectors for the handwritten character indicative of reference directions;

means for converting said fuzzy vectors into membership grades of a plurality of directions representing similarity measures respectively corresponding to said reference directions by using a predetermined membership function;

means for calculating one of a similarity measure and a dissimilarity measure between the group of fuzzy vectors described with said converted membership grades and character data from dictionary data described with a fuzzy vector group respectively corresponding to component vectors of ordinary strokes and at least one of transition strokes and starting-end strokes previously registered in the dictionary; and means for choosing a character from the dictionary data corresponding to said handwritten character based on one of the similarity measure being the greatest and the dissimilarity measure being the smallest.

5. A recording medium readable by a computer having stored thereon executable code for enabling the computer to recognize individual handwritten characters each formed by ordinary strokes sampled, wherein the ordinary strokes of a handwritten character are strokes defined by continuous pen movement on a writing surface from a position whereat the pen is placed on the writing surface to a position whereat the pen is lifted from the writing surface, the code comprising:

procedures for converting each of said ordinary strokes of a handwritten character into component vectors having absolute angles representing directional information;

procedures for determining and converting transition strokes of the handwritten character, defined by pen movement, off a writing surface, from an end of an ordinary stroke to a beginning of a next ordinary stroke of the handwritten character, into component vectors having absolute angles representing directional information;

procedures for determining and converting start-end strokes of the handwritten character, defined by pen movement from a starting point of a first ordinary stroke to starting points and ending points of each of subsequent ordinary strokes of the handwritten character, into component vectors having absolute angles representing directional information;

procedures for dividing said absolute angles into a group of fuzzy vectors for the handwritten character indicative of reference directions;

procedures for converting said fuzzy vectors into membership grades of a plurality of directions representing similarity measures respectively corresponding to said reference directions by using a predetermined membership function;

procedures for calculating one of a similarity measure and a dissimilarity measure between the group of fuzzy vectors described with said converted membership grades and character data from dictionary data described with a fuzzy vector group respectively corresponding to component vectors of ordinary strokes and at least one of transition strokes and starting-end strokes previously registered in the dictionary; and procedures for choosing a character from the dictionary data corresponding to said handwritten character based on one of the similarity measure being the greatest and the dissimilarity measure being the smallest.

6. A method of on-line input handwritten character recognition for recognizing individual handwritten characters each represented by a character line data set comprising a series of coordinates sampled on-line, wherein the character line data set represents one of one ordinary stroke sampled and a plurality of ordinary strokes sampled, the ordinary stroke of a handwritten character being a stroke defined by continuous pen movement on a writing surface from a position whereat the pen is placed on the writing surface to a position whereat the pen is lifted from the writing surface, the method comprising the steps of:

dividing a character line data set of a handwritten character into dot coordinate data defining a predetermined number of component vectors between adjacent ones of dot coordinates;

determining and converting at least one of:

transition strokes of the handwritten character, defined by pen movement, off a writing surface, from an end of an ordinary stroke to a beginning of a next ordinary stroke of the handwritten character, into component vectors having absolute angles representing directional information when the character line data set represents a plurality of ordinary strokes sampled; and start-end strokes of the handwritten character, defined by pen movement from a starting point of a first ordinary stroke to starting points and ending points of each of subsequent ordinary strokes of the handwritten character, into component vectors having absolute angles representing directional information when the character line data set represents a plurality of ordinary strokes sampled;

calculating absolute angles of said component vectors;

applying fuzzy logic to divide said absolute angles into fuzzy vectors indicative of reference directions;

converting said fuzzy vectors into membership grades in a plurality of directions representing similarity measures respectively corresponding to said reference directions by using a predetermined membership function;

calculating one of a similarity measure and a dissimilarity measure between the fuzzy vectors of the handwritten character data represented by said converted membership grades and character data from dictionary data representing fuzzy vectors respectively corresponding to component vectors of a character previously registered in the dictionary data; and extracting a character from the dictionary data corresponding to said handwritten character based on one of the similarity measure being the greatest and the dissimilarity measure being the smallest.

7. The method according to claim 6, wherein said predetermined number is thirty two.

8. The method according to claim 6, further comprising the steps of:

determining whether the extracted character is one of a predetermined set of characters; and applying a proportionality rule to determine which of a group of characters, associated with said extracted character, corresponds to the input character if the chosen character is one said predetermined set.

9. The method according to claim 6, further comprising the steps of:

determining that said one of said similarity measure and said dissimilarity measure of said extracted character does not conform to a threshold indicating that there is no character data in the dictionary data corresponding to the handwritten character; and inputting a visually determined correct character and registering the group of fuzzy vectors described with said converted membership grades of said handwritten character as dictionary data corresponding to said correct character.

10. A handwritten character recognition apparatus for recognizing individual handwritten characters each represented by a character line data set comprising a series of coordinates sampled on-line, wherein the character line data set represents one of one ordinary stroke sampled and a plurality of ordinary strokes sampled, the ordinary stroke of a handwritten character being a stroke defined by continuous pen movement on a writing surface from a position whereat the pen is placed on the writing surface to a position whereat the pen is lifted from the writing surface, the apparatus comprising:

a handwritten character input device for inputting handwritten characters and sampling a handwritten character to produce a character line data set;

means for dividing a character line data set of the handwritten character into dot coordinate data defining a predetermined number of component vectors between adjacent ones of dot coordinates;

means for determining and converting at least one of:

transition strokes of the handwritten character, defined by pen movement, off a writing surface, from an end of an ordinary stroke to a beginning of a next ordinary stroke of the handwritten character, into component vectors having absolute angles representing directional information when the character line data set represents a plurality of ordinary strokes sampled; and start-end strokes of the handwritten character, defined by pen movement from a starting point of a first ordinary stroke to starting points and ending points of each of subsequent ordinary strokes of the handwritten character, into component vectors having absolute angles representing directional information when the character line data set represents a plurality of ordinary strokes sampled;

means for calculating absolute angles of said component vectors;

means for applying fuzzy logic to divide said absolute angles into fuzzy vectors indicative of reference directions;

means for converting said fuzzy vectors into membership grades in a plurality of directions representing similarity measures respectively corresponding to said reference directions by using a predetermined membership function;

means for calculating one of a similarity measure and a dissimilarity measure between the fuzzy vectors of the handwritten character data represented by said converted membership grades and character data from dictionary data representing fuzzy vectors respectively corresponding to component vectors of a character previously registered in the dictionary data; and means for extracting a character from the dictionary data corresponding to said handwritten character based on one of the similarity measure being the greatest and the dissimilarity measure being the smallest.

11. A recording medium readable by a computer having stored thereon executable code for enabling the computer to recognize individual handwritten characters each represented by a character line data set comprising a series of coordinates sampled on-line, wherein the character line data set represents one of one ordinary stroke sampled and a plurality of ordinary strokes sampled, the ordinary stroke of a handwritten character being a stroke defined by continuous pen movement on a writing surface from a position whereat the pen is placed on the writing surface to a position whereat the pen is lifted from the writing surface, the code comprising:

procedures for dividing a character line data set of a handwritten character into dot coordinate data defining a predetermined number of component vectors between adjacent ones of dot coordinates;

procedures for determining and converting at least one of:
transition strokes of the handwritten character, defined by pen movement, off a writing surface, from an end of an ordinary stroke to a beginning of a next ordinary stroke of the handwritten character, into component vectors having absolute angles representing directional information when the character line data set represents a plurality of ordinary strokes sampled; and start-end strokes of the handwritten character, defined by pen movement from a starting point of a first ordinary stroke to starting points and ending points of each of subsequent ordinary strokes of the handwritten character, into component vectors having absolute angles representing directional information when the character line data set represents a plurality of ordinary strokes sampled;

procedures for calculating absolute angles of said component vectors;

procedures for applying fuzzy logic to divide said absolute angles into fuzzy vectors indicative of reference directions;

procedures for converting said fuzzy vectors into membership grades in a plurality of directions representing similarity measures respectively corresponding to said reference directions by using a predetermined membership function;

procedures for calculating one of a similarity measure and a dissimilarity measure between the fuzzy vectors of the handwritten character data represented by said converted membership grades and character data from dictionary data representing fuzzy vectors respectively corresponding to component vectors of a character previously registered in the dictionary data; and procedures for extracting a character from the dictionary data corresponding to said handwritten character based on one of the similarity measure being the greatest and the dissimilarity measure being the smallest.

* * * * *